(12) United States Patent
Liang et al.

(10) Patent No.: US 10,649,089 B2
(45) Date of Patent: May 12, 2020

(54) DATA ACQUISITION METHOD AND APPARATUS FOR DRIVERLESS VEHICLE

(71) Applicant: BEIJING BAIDU NETCOM SCIENCE AND TECHNOLOGY CO., LTD., Beijing (CN)

(72) Inventors: Yibing Liang, Beijing (CN); Bocong Liu, Beijing (CN); Zhuo Chen, Beijing (CN); Wei He, Beijing (CN); Chengliang Deng, Beijing (CN); Kaiwen Feng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 475 days.

(21) Appl. No.: 15/411,795

(22) Filed: Jan. 20, 2017

(65) Prior Publication Data

US 2018/0074202 A1 Mar. 15, 2018

(30) Foreign Application Priority Data

Sep. 13, 2016 (CN) .......................... 2016 1 0821954

(51) Int. Cl.
*G01S 17/88* (2006.01)
*G06F 13/362* (2006.01)
*G01S 17/87* (2020.01)
*G01S 7/00* (2006.01)
(Continued)

(52) U.S. Cl.
CPC .............. *G01S 17/88* (2013.01); *G01S 7/003* (2013.01); *G01S 17/87* (2013.01); *G01S 17/931* (2020.01); *G05D 1/0231* (2013.01); *G05D 1/0257* (2013.01); *G06F 13/3625* (2013.01)

(58) Field of Classification Search
CPC ............................ G06F 13/3625; G01S 17/88
See application file for complete search history.

(56) References Cited

U.S. PATENT DOCUMENTS

2013/0246374 A1 9/2013 Takano
2017/0124476 A1* 5/2017 Levinson ............. G05D 1/0088

FOREIGN PATENT DOCUMENTS

CN 203162051 8/2013
CN 105711597 6/2016

* cited by examiner

*Primary Examiner* — Zachary K Huson
(74) *Attorney, Agent, or Firm* — Lathrom GPM LLP (57) ABSTRACT

The present application discloses a data acquisition method and apparatus for a driverless vehicle. The driverless vehicle is provided with a LIDAR sensor and a camera sensor, and the method of an embodiment comprises: acquiring a collection period of the LIDAR sensor as a first period; acquiring a start time of a current time window; executing following data processing steps: executing real-time acquiring and storing operations on data packets collected by the LIDAR sensor and the camera sensor after the start time of the current time window; and determining whether a following condition is met: the first period has elapsed from the start time of the current time window to a current time; setting the start time of the current time window to the current time in response to determining that the condition is met, and continuing executing the data processing steps. This embodiment realizes synchronized storage of data packets collected by the LIDAR sensor and data packets collected by the camera sensor in the driverless vehicle.

7 Claims, 5 Drawing Sheets

(51) Int. Cl.
*G01S 17/931* (2020.01)
*G05D 1/02* (2020.01)

DATA ACQUISITION METHOD AND APPARATUS FOR DRIVERLESS VEHICLE

CROSS REFERENCE TO RELATED APPLICATIONS

This application claims the priority of Chinese Patent Application No. 201610821954.8, entitled "Data Acquisition Method and Apparatus for Driverless Vehicle," filed on Sep. 13, 2016, the content of which is incorporated herein by reference in its entirety.

TECHNICAL FIELD

The present application relates to the field of motor vehicle technology, in particular to the field of driverless vehicle technology, and more particularly, to a data acquisition method and apparatus for a driverless vehicle.

BACKGROUND

The control system of a driverless vehicle relies on sensors to sense the surrounding environment including vehicles, pedestrians, traffic signs and the like. The driverless vehicle may usually be equipped with a variety of sensor devices to acquire a larger amount of information. Different sensors may complement each other, to provide more comprehensive information to the control system of the driverless vehicle for reception. A LIDAR sensor and a camera sensor are the two most common and at the same time the two principal sensor devices in driverless vehicles.

The LIDAR sensor scans the surrounding environment of the driverless vehicle by using laser and generates point cloud data, and the control system of the driverless vehicle can quickly and easily establish a three-dimensional model for the surrounding environment of the driverless vehicle by means of the point cloud data, so that the LIDAR sensor has become the most important vehicle sensor. The camera sensor may collect image information of the surrounding environment of the driverless vehicle. The control system of the driverless vehicle may combine the image information collected by the camera sensor with the point cloud data collected by the LIDAR sensor, to identify information, such as obstructions, traffic signs, etc., in the surrounding environment of the vehicle, and thus the camera is also a very important vehicle sensor.

The two principal sensors, namely the LIDAR sensor and the camera sensor, may cooperate with each other to cover a wider range, and the acquired information authenticates each other, to improve the environment identifying accuracy of the control system of the driverless vehicle, and to ensure the stability of the control system in the event that a single sensor is abnormal or has an malfunction.

Currently, however, a merging process is generally executed only on sensor data of the same type. Output data from different types of sensors are processed through separate collection, filtration etc. Data from different types of sensors are currently not merged. Primary causes are as follows: (1) the data collected by different types of sensors adopt different data formats, for example, the data collected by the LIDAR sensor is output in the point cloud format, and the data collected by the camera sensor data is generally output in the image coding format; (2) due to different hardware parameters in different types of sensors, there are certain variations in collection periods and collection frequencies of the different types of sensors, for example, a common LIDAR sensor has a collection frequency of 10 Hz, and a collection period of 100 ms. A camera sensor has a collection frequency of about 20-50 Hz, i.e., a collection period of 2-5 ms. Therefore, the control system of the driverless vehicle does not realize synchronized storage of data packets collected by the LIDAR sensor and data packets collected by the camera sensor.

SUMMARY

An objective of the present application is to propose a data acquisition method and apparatus for a driverless vehicle, for solving the technical problem mentioned in the foregoing Background section.

In a first aspect, the present application provides a data acquisition method for a driverless vehicle, the driverless vehicle provided with a LIDAR sensor and a camera sensor, the method comprising: acquiring a collection period of the LIDAR sensor as a first period; acquiring a start time of a current time window; executing following data processing steps: executing real-time acquiring and storing operations on data packets collected by the LIDAR sensor and the camera sensor after the start time of the current time window; and determining whether a following condition is met: the first period has elapsed from the start time of the current time window to a current time; setting the start time of the current time window to the current time in response to determining that the condition is met, and continuing executing the data processing steps.

In some embodiments, the LIDAR sensor comprises at least one LIDAR sensor; and the acquiring the collection period of the LIDAR sensor as the first period comprises: acquiring sensor information of each LIDAR sensor in the at least one LIDAR sensor, the sensor information comprising: an importance level and a collection period; selecting an LIDAR sensor having a highest importance level in the at least one LIDAR sensor as a first LIDAR sensor; and acquiring a collection period of the first LIDAR sensor as the first period.

In some embodiments, the executing the real-time acquiring and storing operations on the data packets collected by the LIDAR sensor and the camera sensor after the start time of the current time window comprises: acquiring in real time the data packets collected by the LIDAR sensor and the camera sensor after the start time of the current time window and storing the acquired data packets into a cache indicated by a cache address corresponding to the current time window, and the method further comprises, after the setting the start time of the current time window to the current time: setting a corresponding cache address for the current time window.

In some embodiments, the data packets are data packets with time stamps.

In some embodiments, the importance level of the LIDAR sensor is preset based on position information of the LIDAR sensor in the driverless vehicle.

In a second aspect, the present application provides a data acquisition apparatus for a driverless vehicle, the driverless vehicle provided with a LIDAR sensor and a camera sensor, the apparatus comprising: a first acquisition unit, configured to acquire a collection period of the LIDAR sensor as a first period; a second acquisition unit, configured to acquire a start time of a current time window; a first execution unit, configured to execute following data processing steps: executing real-time acquiring and storing operations on data packets collected by the LIDAR sensor and the camera sensor after the start time of the current time window; and determining whether a following condition is met: the first period has elapsed from the start time of the current time window to a current time; a second execution unit, configured to set the start time of the current time window to the current time in response to determining that the condition is met, and continue executing the data processing steps.

In some embodiments, the LIDAR sensor comprises at least one LIDAR sensor; and the first acquisition unit comprises: a first acquisition module, configured to acquire sensor information of each LIDAR sensor in the at least one LIDAR sensor, the sensor information comprising: an importance level and a collection period; a selection module, configured to select an LIDAR sensor having a highest importance level in the at least one LIDAR sensor as a first LIDAR sensor; and a second acquisition module, configured to acquire a collection period of the first LIDAR sensor as the first period.

In some embodiments, the first execution unit is further configured to acquire in real time the data packets collected by the LIDAR sensor and the camera sensor after the start time of the current time window and store the acquired data packets into a cache indicated by a cache address corresponding to the current time window; and the second execution unit is further configured to: set a corresponding cache address for the current time window.

In some embodiments, the data packets are data packets with time stamps.

In some embodiments, the importance level of the LIDAR sensor is preset based on position information of the LIDAR sensor in the driverless vehicle.

The data acquisition method and apparatus for a driverless vehicle provided in the present application, by acquiring a collection period of the LIDAR sensor as a first period; acquiring a start time of a current time window; executing following data processing steps: executing real-time acquiring and storing operations on data packets collected by the LIDAR sensor and the camera sensor after the start time of the current time window; and determining whether a following condition is met: the first period has elapsed from the start time of the current time window to a current time; setting the start time of the current time window to the current time in response to determining that the condition is met, and continuing executing the data processing steps, realizes synchronized storage of data packets collected by the LIDAR sensor and data packets collected by the camera sensor of the driverless vehicle.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
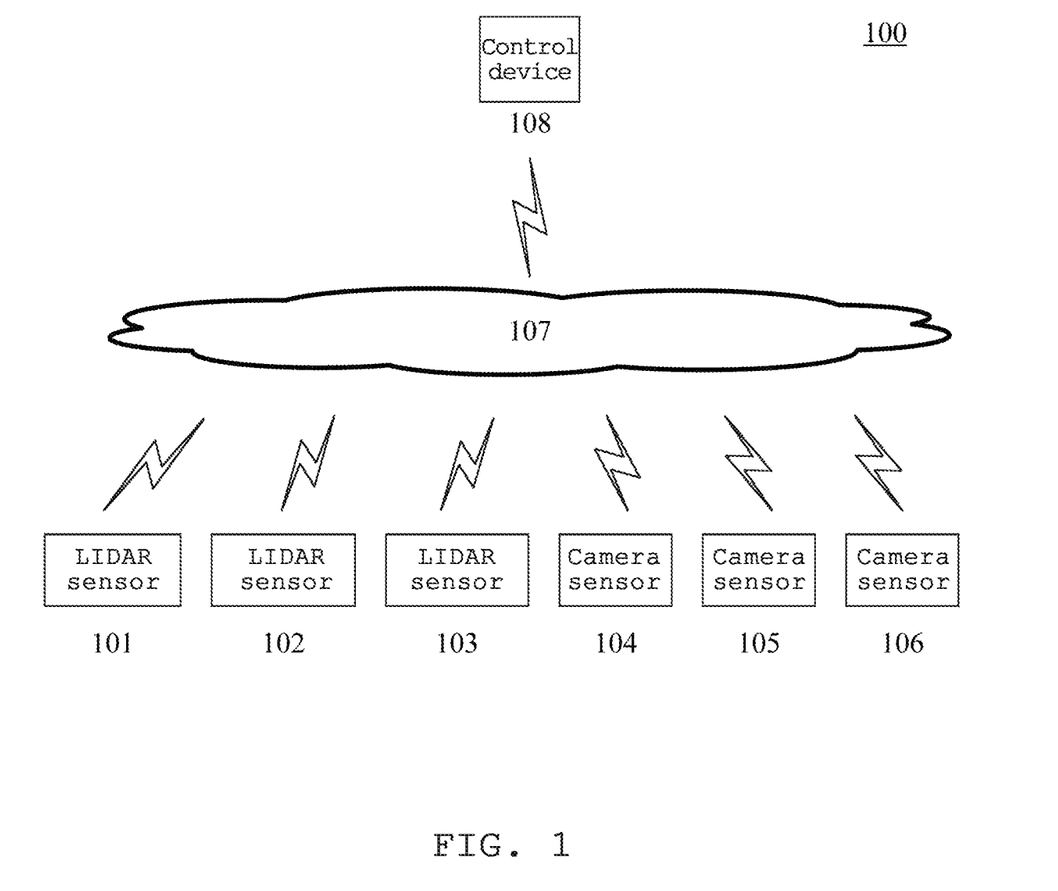
FIG. 1 is an architectural diagram of an exemplary system in which the present application may be implemented.

FIG. 1 shows an exemplary system architecture 100 in which a data acquisition method for a driverless vehicle or a data acquisition apparatus for a driverless vehicle according to embodiments of the present application may be implemented.

As shown in FIG. 1, the system architecture 100 may include LIDAR sensors 101, 102, and 103, camera sensors 104, 105, and 106, a network 107, and a control device 108. The network 107 serves as a medium providing a communication link between the LIDAR sensors 101, 102, and 103, the camera sensors 104, 105, and 106, and the control device 108. The network 107 may include various types of connections, such as wired and wireless communication links, a bus, a cable, or a fiber-optic cable. Different sensors may interact with the control device 108 in different ways. For example, the LIDAR sensors 101, 102, and 103 may transmit data to the control device 108 through a cable, and the camera sensors 104, 105, and 106 may send collected image data to a bus of a vehicle, and the control device 108 may acquire the image data from the bus of the vehicle.

The LIDAR sensors 101, 102, and 103 and the camera sensors 104, 105, and 106 interact with the control device 108 through the network 107, for receiving or sending messages, or the like. For example, the control device 108 may send a control instruction to the LIDAR sensors 101, 102, and 103 and the camera sensors 104, 105, and 106 through the network 107, and the LIDAR sensor 101, 102, and 103 and the camera sensors 104, 105, and 106 may send the data packets respectively collected to the control device 108 through the network 107. A variety of applications, such as sensor data acquiring applications, sensor data processing applications, and driverless vehicle control applications, may be installed on the control device 108.

It should be noted that, the data acquisition method for a driverless vehicle provided by the embodiments of the present application is generally executed by the control device 108, and accordingly, the data acquisition apparatus for a driverless vehicle is generally provided in the control device 108.

It should be understood, the numbers of the LIDAR sensors, the camera sensors, the networks and the control devices are merely illustrative. Any number of LIDAR sensors, camera sensors, networks, and control devices may be provided based on actual requirements.

Figure 2:
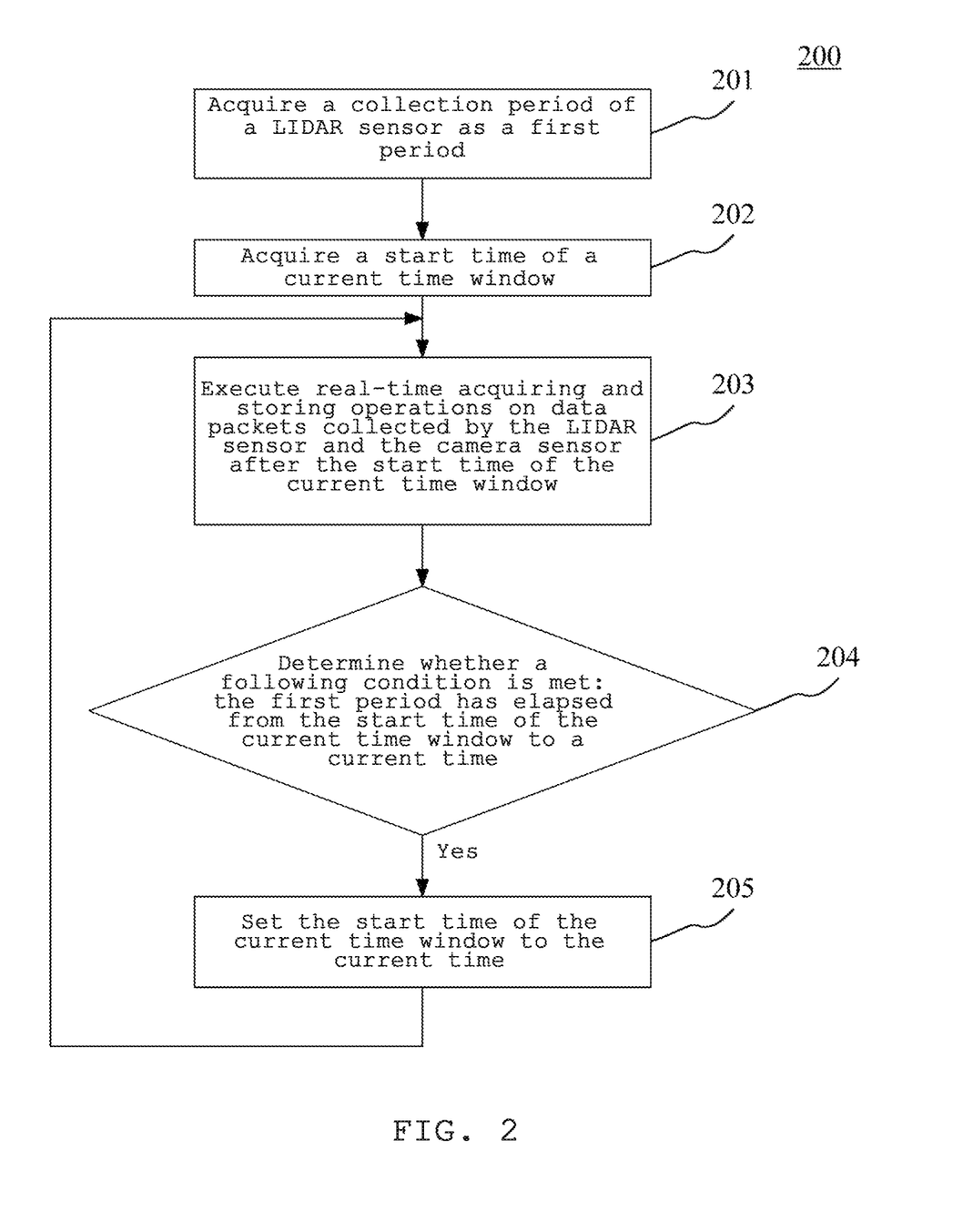
FIG. 2 is a flowchart of a data acquisition method for a driverless vehicle according to an embodiment of the present application.

Further referring to FIG. 2, a procedure 200 of an embodiment of a data acquisition method for a driverless vehicle according to the present application is shown. The data acquisition method for a driverless vehicle comprises the following steps:

Step 201, acquire a collection period of a LIDAR sensor as a first period.

In this embodiment, the collection period of the LIDAR sensor of the driverless vehicle may be locally stored in an electronic device (for example, the control device shown in FIG. 1) on which the data acquisition method of the driverless vehicle is operated, such that the above-mentioned electronic device is capable of locally acquiring the collection period of the LIDAR sensor provided in the driverless vehicle in which the electronic device is located. The collection period of the LIDAR sensor of the driverless vehicle may also be stored on a cloud server providing support to the above-mentioned driverless vehicle, so that the above-mentioned electronic device is capable of acquiring the collection period of the LIDAR sensor of the driverless vehicle from the above-mentioned cloud server remotely.

In some optional implementations of this embodiment, when the laser sensor in the driverless vehicle comprises at least one LIDAR sensor, the following step may be adopted for acquiring the collection period of the LIDAR sensor as the first period:

First, the above-mentioned electronic device may acquire sensor information of each LIDAR sensor in the at least one LIDAR sensor, and the sensor information herein may comprise an importance level and a collection period.

Herein, the importance level may be preset for each LIDAR sensor of the driverless vehicle. The importance level represents the importance of the role that the LIDAR sensor plays in the control system of the driverless vehicle. The importance level may be represented in various ways. As an example, the importance levels may be represented by numbers, for example, the importance levels comprise: five levels including "1", "2", "3", "4", and "5", wherein "1" is the lowest level, and "5" is the highest level; the importance levels may also be represented by characters, for example, the importance levels may comprise: five levels including "A", "B", "C", "D", and "E", wherein "A" is the lowest level, and "E" is the highest level; the importance levels may also be represented by texts, for example, the importance levels may comprise: five levels including "the most important", "very important", "important", "normal", and "not important", wherein "the most important" is the highest level, and "not important" is the lowest level.

In some optional implementations of this embodiment, the importance level of the LIDAR sensor may be preset based on the position information of the LIDAR sensor in the driverless vehicle. For example, the LIDAR sensor positioned on the top of the driverless vehicle, due to its large scanning range, can be set to the highest importance level.

Herein, a collection period may be preset for each LIDAR sensor of the driverless vehicle. The collection period represents the time needed for the LIDAR sensor to collect data once. The collection period of the LIDAR sensor may be preset based on hardware parameters of the LIDAR sensor. For example, the time for the LIDAR sensor to take a turn is 100 ms, and 100 ms is the collection period of the LIDAR sensor.

Then, an LIDAR sensor having the highest importance level in the at least one LIDAR sensor may be selected as a first LIDAR sensor.

Finally, a collection period of the first LIDAR sensor may be acquired as a first period.

Step 202, acquire a start time of a current time window.

In this embodiment, a time window comprises a start time and an end time, and a difference between the end time and the start time of the time window is a window length of the time window. Here, acquiring the start time of the current time window may refer to, when the driverless vehicle converts from a stop state or an engine off state into a driving state, acquiring a current time as the start time of the current time window, and after the start time of the current time window is acquired, the electronic device may turn to Step 203 for acquiring and storing in real time data packets collected by the LIDAR sensor and the camera sensor of the driverless vehicle after the start time of the current time window. In the process of executing the real-time acquiring and storing operations on the data packets collected by the LIDAR sensor and the camera sensor in Step 203, only one current time window is provided at the same time. After the current time window starts, the procedure proceeds to Step 203 to execute the real-time acquiring and storing operations, and determines whether the condition for ending the current time window is met in Step 204, and if yes, proceeds to Step 205 to end the current time window and enter a next time window. The start time of the next time window is the end time of the last time window, and Step 204 is re-executed by using the next time window as the current time window.

In some optional implementations of this embodiment, the above-mentioned electronic device may acquire a current time provided by an operating system thereof as the start time of the current time window.

In some optional implementations of this embodiment, the above-mentioned electronic device may also remotely acquire, from a cloud server providing a time service, a current time provided by the cloud server as the start time of the current time window.

In some optional implementations of this embodiment, the electronic device may also acquire, from a GPS (Global Positioning System) installed on the driverless vehicle, a current time provided by the GPS as the start time of the current time window.

Step 203, execute the real-time acquiring and storing operations on the data packets collected by the LIDAR sensor and the camera sensor after the start time of the current time window.

In this embodiment, the above-mentioned electronic device may execute the real-time acquiring and storing operations on the data packets collected by the LIDAR sensor and the camera sensor after the start time of the current time window.

In some optional implementations of this embodiment, the above-mentioned electronic device may acquire in real time the data packets collected by the LIDAR sensor and the camera sensor after the start time of the current time window and store the acquired data packets into a cache indicated by a cache address corresponding to the current time window. Herein, the cache address corresponding to the current time window may be a corresponding cache address set for the current time window after the start time of the current time window is set as the current time in Step 205 and before the procedure proceeds to Step 203. Based on the above-mentioned operation, data packets collected by the LIDAR sensor and the camera sensor within one time window are stored into a cache indicated by a cache address, and data packets collected by the LIDAR sensor and the camera sensor within different time windows are stored into caches indicated by cache addresses corresponding to different time windows, such that the aligned storage of the data packets collected by the LIDAR sensor and the camera sensor is realized.

In some optional implementations of this embodiment, the data packets collected by the LIDAR sensor and the camera sensor may be data packets with time stamps. The data content contained in the data packet may be sensed data generated by the sensors (for example, for the LIDAR sensor, the sensed data may be position information and reflection value intensity information of an object scanned by the LIDAR sensor, and for the camera sensor, the sensed data may be image information of the surrounding environment of the driverless vehicle), and the time stamp indicates the time when the data packet is generated (that is the time when the sensor collects the data packet).

Step 204, determine whether the following condition is met: the first period has elapsed from the start time of the current time window to the current time; if it is determined that the condition is met, the procedure proceeds to Step 205.

In this embodiment, the electronic device may determine in real time whether the following condition is met in the process of executing the real-time acquiring and storing operations on the data packets collected by the LIDAR sensor and the camera sensor after the start time of the current time window: the first period has elapsed from the start time of the current time window to the current time. If it is determined that the condition is met, the procedure may proceed to Step 205.

Step 205, set the start time of the current time window to the current time, and turn to Step 203 to continue.

In this embodiment, in the event that the above-mentioned electronic device may determine that the above-mentioned condition is met, the start time of the current time window is set to the current time (that is, the previous time window ends, and the next time window starts), and the procedure proceeds to Step 203 to continue.

In some optional implementations of this embodiment, this electronic device may also set a corresponding cache address for the current time window after setting the start time of the current time window as the current time and before proceeding to Step 203. That is, the previous time window has ended, and the cache address corresponding to the current time window may be different from the cache address of the previous time window; therefore, it is necessary to set a new cache address for the current time window, so as to determine, after the current time window starts, to store the data packets collected by the LIDAR sensor and the camera sensor after the start time of the current time window into the cache indicated by the cache address corresponding to the current time window.

It should be noted that, if the driverless vehicle is in a driving state, the data processing steps from Step 203 to Step 205 may be ongoing, with a purpose of providing information for the control system of the driverless vehicle via the data packets collected by the LIDAR sensor and the camera sensor, so as to enable the control system of the driverless vehicle to generate a control instruction for controlling the driving of the vehicle. If the driverless vehicle is in a stop state or an engine off state, the data processing steps from Step 203 to Step 205 may stop. When the driverless vehicle is in the driving state again, the procedure may be re-executed from Step 201.

In some optional implementations of this embodiment, a Robot Operating System (ROS) may be installed in the control device of the above-mentioned driverless vehicle. The ROS may be formed by many nodes and topics, and each node may be a separate process. The nodes can be classified into two types: a sending node and a receiving node, wherein the sending node may be configured to send collected data, and the receiving node may be configured to receive the data sent by the sending data (sometimes a node may be both the sending node and the receiving node). The topics are the basis for establishing a connection between the nodes. After a connection is established between the nodes, the sending node and the receiving node may implement data transmission through a shared memory. In addition, for transmitting data of different topics, different shared memories may be used. The above-mentioned data acquisition method for the driverless vehicle may be a sending node in the ROS, which, according to the above-mentioned data acquisition method for the driverless vehicle, aligns the data packets collected by the LIDAR sensor and the camera sensor on the driverless vehicle and stores the acquired data packets in a shared memory serving as a transmission medium between the sending node and the receiving node, and after the current time window of the sending node ends, may send a message to the receiving node, indicating that the data packets collected by the LIDAR sensor and the camera sensor have been stored alignedly, such that the receiving node may acquire the data packets collected by the LIDAR sensor and the camera sensor that are stored alignedly from the shared memory serving as the transmission medium between the sending node and the receiving node, and the receiving node may process the acquired data packets correspondingly to generate a control instruction for controlling the driverless vehicle. That is, the sending node and the receiving node together implement fusing the data for sensing the external environment collected by the LIDAR sensor and the camera sensor and converting the fused data into the control instruction, thereby achieving the objective of controlling the driverless vehicle.

Figure 3:
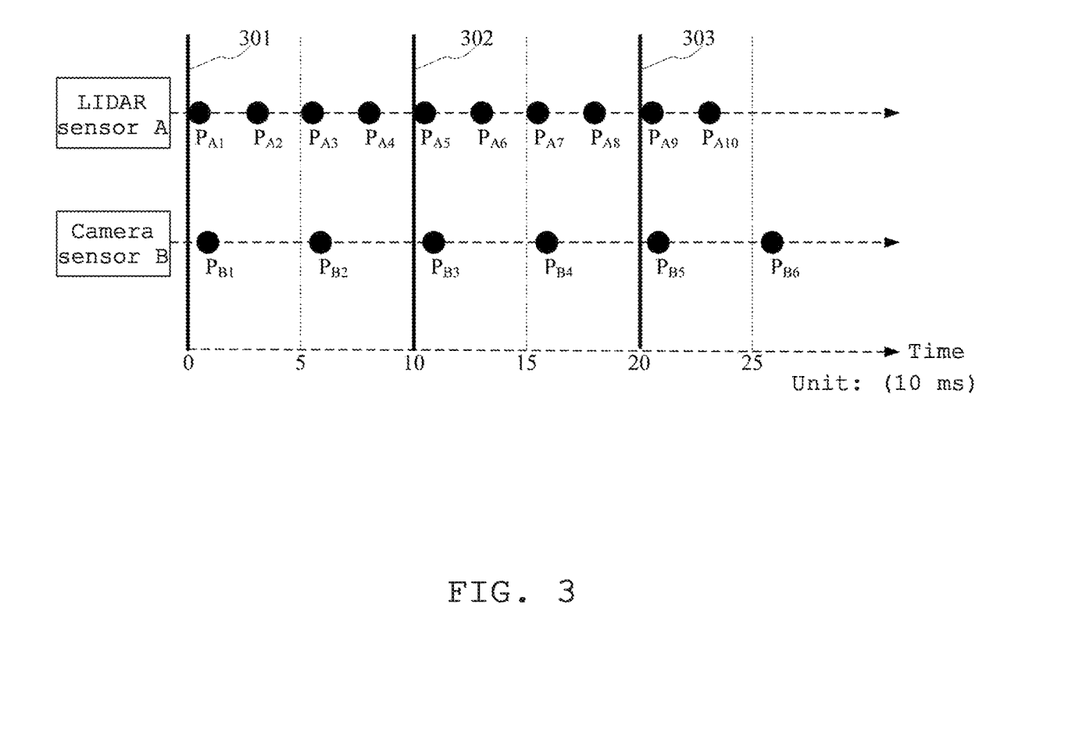
FIG. 3 is a schematic diagram of an application scenario of a data acquisition method for a driverless vehicle according to the present application.

Further referring to FIG. 3, a schematic diagram of an application scenario of the data acquisition method for a driverless vehicle according to this embodiment is shown. In FIG. 3, the horizontal axis represents time, the vertical axis represents different sensors, including an LIDAR sensor A and a camera sensor B, black dots represent the data packets collected by different sensors at corresponding time points, wherein $P_{A1}$ represents the first data packet collected by the LIDAR sensor A, $P_{A2}$ represents the second data packet collected by the LIDAR sensor A, . . . , and $P_{A10}$ represents the tenth data packet collected by the LIDAR sensor A; $P_{B1}$ represents the first data packet collected by the camera sensor B, $P_{B2}$ represents the second data packet collected by the camera sensor B, . . . , and $P_{B6}$ represents the sixth data packet collected by the camera sensor B. The collection period of the LIDAR sensor is 100 ms, that is, the first period is 100 ms. Therefore, despite of how many data packets are collected by the LIDAR sensor A and the camera sensor B, as long as the first period (that is, 100 ms) has elapsed from the start time of the current time window to the current time, the current time is taken as the start time of the current time window for ending the previous time window and entering the next time window. As shown in FIG. 3, the start time of the first time window is 0 ms (a time point indicated by a straight line shown by an icon 301 in FIG. 3), and the end time is 100 ms obtained by adding the first period (i.e., 100 ms) to the start time (a time point indicated by a straight line shown by an icon 302 in FIG. 3); between the start time 0 ms of the first time window to the end time 100 ms of the first time window, the control device has acquired and stored in real time four data packets $P_{A1}$, $P_{A2}$, $P_{A3}$, and $P_{A4}$ collected by the LIDAR sensor A after the start time of the first time window and two data packets $P_{B1}$ and $P_{B2}$ collected by the camera sensor B after the start time of the first time window, and at this time, the condition that "the first period has elapsed from the start time of the current time window to the current time" has been met. Therefore, the control device sets the start time of the current window to the current time 100 ms, thereby entering the second time window. The start time of the second time window is 100 ms, the end time is 200 ms obtained by adding the first period (i.e., 100 ms) to the start time; between the start time 100 ms of the second time window to the end time 200 ms of the second time window (a time point indicated by a straight line shown by an icon 303 in FIG. 3), the control device has acquired and stored in real time four data packets data packets $P_{A5}$, $P_{A6}$, $P_{A7}$, and $P_{A8}$ collected by the LIDAR sensor A after the start time of the second time window, and two data packets $P_{B3}$ and $P_{B4}$ collected by the camera sensor B after the start time of the second time window, and at this time, the condition that "the first period has elapsed from the start time of the current time window to the current time" has been met. Therefore, the control device sets the start time of the current window to the current time 200 ms, thereby entering the third time window. The start time of the third time window is 200 ms, and the end time is 300 ms obtained by adding the first period (i.e., 100 ms) to the start time, . . . , and so it goes on. Through the above-mentioned data processing steps, the control device realizes the aligned storage between the data packets collected by the LIDAR sensor and the camera sensor.

The method provided in the above-mentioned embodiment of the present application, by acquiring the collection period of the LIDAR sensor as the first period, then acquiring the start time of the current time window, and then executing the following data processing steps: executing the real-time acquiring and storing operations on data packets collected by the LIDAR sensor and the camera sensor after the start time of the current time window; and determining whether the following condition is met: the first period has elapsed from the start time of the current time window to the current time; in response to determining that the condition is met, setting the start time of the current time window as the current time, and continuing executing the data processing steps, realizes the aligned storage between the data packets collected by the LIDAR sensor and the data packets collected by the camera sensor of the driverless vehicle.

Figure 4:
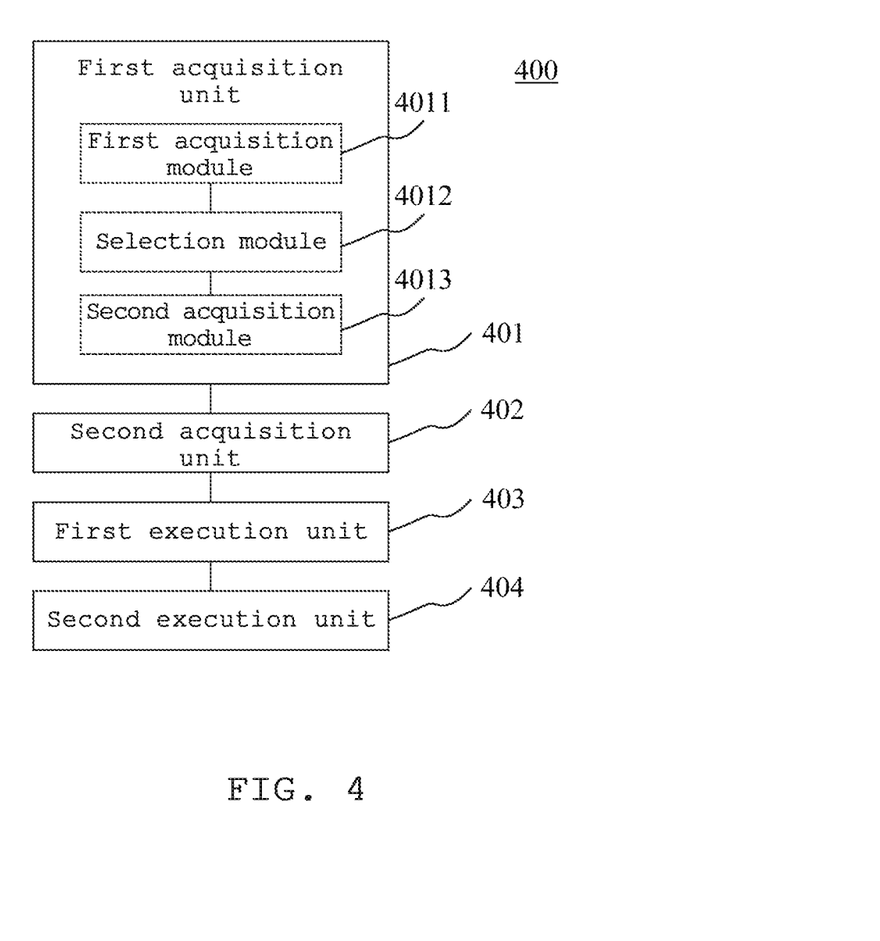
FIG. 4 is a schematic structural diagram of a data acquisition apparatus for a driverless vehicle according to an embodiment of the present application.

Further referring to FIG. 4, as an implementation of the methods shown in the above-mentioned figures, the present application provides an embodiment for a data acquisition apparatus for a driverless vehicle. The apparatus embodiment corresponds to the method embodiment shown in FIG. 2, and the apparatus may be specifically applied in a variety of electronic devices.

As shown in FIG. 4, the data acquisition apparatus 400 for the driverless vehicle in this embodiment comprises: a first acquisition unit 401, a second acquisition unit 402, a first execution unit 403, and a second execution unit 404. The first acquisition unit 401 is configured to acquire a collection period of the LIDAR sensor as a first period; the second acquisition unit 402 is configured to acquire a start time of a current time window; the first execution unit 403 is configured to execute the following data processing steps: executing real-time acquiring and storing operations on data packets collected by the LIDAR sensor and the camera sensor after the start time of the current time window; and determining whether the following condition is met: the first period has elapsed from the start time of the current time window to a current time; and the second execution unit 404 is configured to, in response to determining that the condition is met, set the start time of the current time window to the current time, and continue executing the data processing steps.

In this embodiment, the concrete processes of the first acquisition unit 401, the second acquisition unit 402, the first execution unit 403, and the second execution unit 404 of the data acquisition apparatus 400 for a driverless vehicle and the technical effects they bring can refer to the relevant illustrations of Step 201, Step 202, Step 203, Step 204, and Step 205 in the corresponding embodiments of FIG. 2, and will not be repeated herein.

In some optional implementations of this embodiment, the above-mentioned LIDAR sensor may be at least one LIDAR sensor; and the first acquisition unit 401 may comprise: a first acquisition module 4011, configured to acquire sensor information of each LIDAR sensor in the at least one LIDAR sensor, the sensor information comprising: an importance level and a collection period; a selection module 4012, configured to select an LIDAR sensor having the highest importance level in the at least one LIDAR sensor as a first LIDAR sensor; and a second acquisition module 4013, configured to acquire a collection period of the first LIDAR sensor as the first period.

In some optional implementations of this embodiment, the first execution unit 403 may be further configured to acquire in real time the data packets collected by the above-mentioned LIDAR sensor and the above-mentioned camera sensor after the start time of the above-mentioned current time window and store the acquired data packets into a cache indicated by a cache address corresponding to the above-mentioned current time window; and the second execution unit 404 may be further configured to: set a corresponding cache address for the above-mentioned current time window.

In some optional implementations of this embodiment, the data packets may be data packets with time stamps.

In some optional implementations of this embodiment, the importance level of the above-mentioned LIDAR sensor may be preset based on the position information of the LIDAR sensor in the above-mentioned driverless vehicle.

Figure 5:
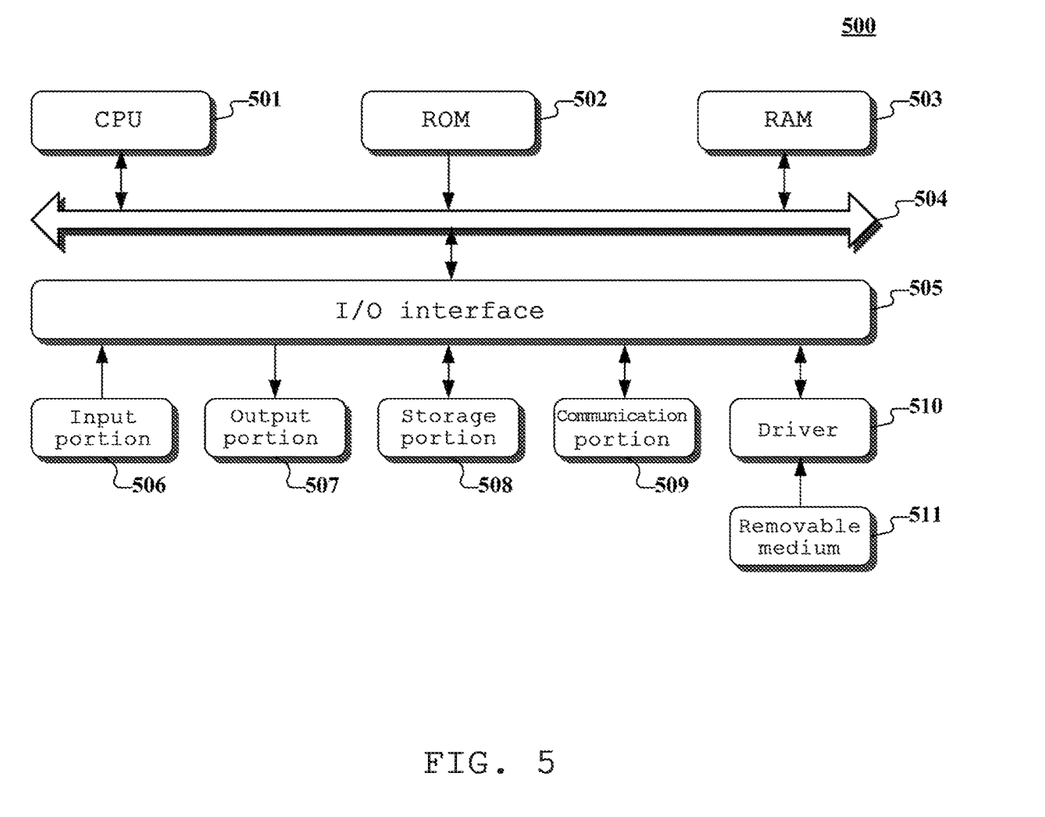
FIG. 5 is a schematic structural diagram of a computer system adapted to implement a control device of the embodiments of the present application.

Referring to FIG. 5, a schematic structural diagram of a computer system 500 adapted to implement a control device of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a sensor, an ECU (Electronic Control Unit) etc.; an output portion 507 comprising a sensor, an ECU etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first acquisition unit, a second acquisition unit, a first execution unit and a second execution unit, where the names of these units or modules are not considered as a limitation to the units or modules. For example, the acquisition unit may also be described as "a unit for acquiring a collection period."

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to perform a data acquisition method for a driverless vehicle, the driverless vehicle provided with a LIDAR sensor and a camera sensor, the method comprising: acquiring a collection period of the LIDAR sensor as a first period; acquiring a start time of a current time window; executing following data processing steps: executing real-time acquiring and storing operations on data packets collected by the LIDAR sensor and the camera sensor after the start time of the current time window; and determining whether a following condition is met: the first period has elapsed from the start time of the current time window to a current time; setting the start time of the current time window to the current time in response to determining that the condition is met, and continuing executing the data processing steps.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data acquisition method for a driverless vehicle, the driverless vehicle provided with at least one LIDAR sensor and a camera sensor, the method comprising:
    acquiring sensor information of each LIDAR sensor in the at least one LIDAR sensor, the sensor information comprising: an importance level and a collection period;
    selecting an LIDAR sensor having a highest importance level in the at least one LIDAR sensor as a first LIDAR sensor;
    acquiring a collection period of the first LIDAR sensor as a first period;
    acquiring a start time of a current time window;
    executing following data processing steps: executing real-time acquiring and storing operations on data packets collected by the LIDAR sensor and the camera sensor after the start time of the current time window; and determining whether a following condition is met: the first period has elapsed from the start time of the current time window to a current time;
    setting the start time of the current time window to the current time in response to determining that the condition is met, and continuing executing the data processing steps;
    wherein the executing the real-time acquiring and storing operations on the data packets collected by the LIDAR sensor and the camera sensor after the start time of the current time window comprises:
    acquiring in real time the data packets collected by the LIDAR sensor and the camera sensor after the start time of the current time window and storing the acquired data packets into a cache indicated by a cache address corresponding to the current time window, and
    the method further comprises, after the setting the start time of the current time window to the current time:
    setting a corresponding cache address for the current time window.

2. The method according to claim 1, wherein, the data packets are data packets with time stamps.

3. The method according to claim 1, wherein, the importance level of the LIDAR sensor is preset based on position information of the LIDAR sensor in the driverless vehicle.

4. A data acquisition apparatus for a driverless vehicle, the driverless vehicle provided with at least one LIDAR sensor and a camera sensor, the apparatus comprising:
    a first acquisition unit, configured to acquire sensor information of each LIDAR sensor in the at least one LIDAR sensor, the sensor information comprising: an importance level and a collection period; select an LIDAR sensor having a highest importance level in the at least one LIDAR sensor as a first LIDAR sensor; and acquire a collection period of the first LIDAR sensor as a first period;
    a second acquisition unit, configured to acquire a start time of a current time window;
    a first execution unit, configured to execute following data processing steps: executing real-time acquiring and storing operations on data packets collected by the LIDAR sensor and the camera sensor after the start time of the current time window; and determining whether a following condition is met: the first period has elapsed from the start time of the current time window to a current time;

a second execution unit, configured to set the start time of the current time window to the current time in response to determining that the condition is met, and continue executing the data processing steps;

wherein, the first execution unit is further configured to:

acquire in real time the data packets collected by the LIDAR sensor and the camera sensor after the start time of the current time window and store the acquired data packets into a cache indicated by a cache address corresponding to the current time window; and the second execution unit is further configured to: set a corresponding cache address for the current time window.

5. The apparatus according to claim 4, wherein, the data packets are data packets with time stamps.

6. The apparatus according to claim 4, wherein, the importance level of the LIDAR sensor is preset based on position information of the LIDAR sensor in the driverless vehicle.

7. A non-transitory storage medium storing one or more programs, the one or more programs when executed by a device, causing the device to perform a data acquisition method for a driverless vehicle, the driverless vehicle provided with at least one LIDAR sensor and a camera sensor, the method comprising:

acquiring sensor information of each LIDAR sensor in the at least one LIDAR sensor, the sensor information comprising: an importance level and a collection period;

selecting an LIDAR sensor having a highest importance level in the at least one LIDAR sensor as a first LIDAR sensor;

acquiring a collection period of the first LIDAR sensor as a first period;

acquiring a start time of a current time window;

executing following data processing steps: executing real-time acquiring and storing operations on data packets collected by the LIDAR sensor and the camera sensor after the start time of the current time window; and determining whether a following condition is met: the first period has elapsed from the start time of the current time window to a current time;

setting the start time of the current time window to the current time in response to determining that the condition is met, and continuing executing the data processing steps;

wherein the executing the real-time acquiring and storing operations on the data packets collected by the LIDAR sensor and the camera sensor after the start time of the current time window comprises:

acquiring in real time the data packets collected by the LIDAR sensor and the camera sensor after the start time of the current time window and storing the acquired data packets into a cache indicated by a cache address corresponding to the current time window, and the method further comprises, after the setting the start time of the current time window to the current time:

setting a corresponding cache address for the current time window.

* * * * *